United States Patent [19]

Sandeen et al.

[11] Patent Number: 4,901,662
[45] Date of Patent: Feb. 20, 1990

[54] ANTENNA-MOUNTABLE WINDSOCK COMPRISING RIGID CYLINDER WITH LEVELING HOLES

[76] Inventors: Stephen Sandeen, 3243 Marilyn Ct., Pleasanton, Calif. 94566; Todd Rich, 650 El Camino Real, #P, Redwood City, Calif. 94063

[21] Appl. No.: 241,888

[22] Filed: Sep. 8, 1988

Related U.S. Application Data

[63] Continuation-in-part of Ser. No. 173,889, Mar. 28, 1988, abandoned.

[51] Int. Cl.$^4$ .............................................. B60Q 1/00
[52] U.S. Cl. ................................................... 116/28 R
[58] Field of Search ............................... 116/173–175, 116/28 R, 26, 264; 40/591, 214, 215, 593, 592; 73/188, 189

[56] References Cited

U.S. PATENT DOCUMENTS

| | | | |
|---|---|---|---|
| 2,478,273 | 8/1949 | Jenkins | 116/173 |
| 2,869,507 | 1/1959 | Boyer | 116/173 |
| 3,107,648 | 10/1963 | Lundstrom | 116/173 |
| 3,359,670 | 12/1967 | Pyc et al. | 40/591 |
| 4,114,299 | 9/1978 | Brownlee | 40/591 |
| 4,526,820 | 7/1985 | Haas | 40/591 |
| 4,627,278 | 12/1986 | Soto | 116/173 |

FOREIGN PATENT DOCUMENTS

1038366  9/1953  France ............................. 40/215

*Primary Examiner*—William A. Cuchlinski, Jr.
*Assistant Examiner*—Jeff Hohenshell
*Attorney, Agent, or Firm*—David Pressman

[57] ABSTRACT

A message-carrying, antenna-mountable windsock allows a car owner to express a thought or concept. The windsock is tubular, preferably tapered, and is attached to the antenna of an automobile via holes in the top and bottom sides of the front end of the windsock. Several holes are provided for enabling the windsock to be horizontally positioned regardless of the angle of the antenna. The windsock is held in position on the antenna by a segment of slit rubber tubing, plastic twist ties, or both, positioned on the part of the antenna's shaft inside the windsock. A message, advertising, etc. is printed on the side of the windsock. The sock is very inexpensive to produce and the stock is easy to attach and remove.

19 Claims, 8 Drawing Sheets

ANTENNA-MOUNTABLE WINDSOCK COMPRISING RIGID CYLINDER WITH LEVELING HOLES

BACKGROUND—CROSS REFERENCE TO RELATED APPLICATION

This is a continuation-in-part of application Ser. No. 07/173,889, Filed 3-28, now abandoned.

BACKGROUND—FIELD OF INVENTION

This invention relates to automotive decorations, specifically to a windsock or other message-bearing device which can be be attached to an automobile antenna.

BACKGROUND—PRIOR ART

The airport windsock is a hollow cone made of flexible, waterproof material that inflates with the wind so that its smaller edge points downwind. Wind speed can be estimated by the degree of wind sock inflation, and the amount of crosswind can be estimated by observing its orientation with respect to the runway. Since these windsocks are used to measure wind velocity, they are not meant as forms of self expression.

One disadvantage of the airport windsock is its size: it is simply to big for an automobile antenna. Also it is attached by ropes or string which would be highly unstable on an automobile antenna. Further it comes in one color, orange. In addition it is not designed to be stable in high-velocity winds.

One windsock is shown in Hayes U.S. Pat. No. 2,090,121 (1937). However its geometric design does not allow for the most efficient flight and without a frame it will be even more inefficient.

Decorative windsocks are also known; streamers usually are attached to their rear. They are unsightly in their basic design as the streamers distract from the message or messages being conveyed. The method of attachment is by sitting which has proved highly unstable in windsock testing at all speeds. This "garden style windsock" is purely a means of decoration, rather than a means of expression.

OBJECTS AND ADVANTAGES

Accordingly, one object and advantage of the invention is to provide a windsock which can be attached to a vehicle's antenna to convey a message, slogan, saying, word, picture, symbol, logo, etc. Additional objects and advantages are to provide a method of self-expression for vehicle owners unlike anything heretofore used, to satisfaction provide for such owners by enabling them to express a slogan, word, favorite term, flag, logo, etc. and to provide a sign that inflates with the wind by movement of a vehicle.

Further objects and advantages are to provide a form of advertisement individually, for clubs, groups, companies, major corporations, or any entity that can use a form of advertisement, and to provide a device which can be used by itself for its geometric, decorative effect with no form of advertisement, message, or word.

Still further objects and advantages of the invention will be apparent from a consideration of the ensuing description and the accompanying drawings.

DRAWING REFERENCE NUMERALS

1 Front ring
2 Fabric covering
3 Top antenna hole
4 Middle bottom antenna opening
4A Optional rear bottom antenna hole
5 Front bottom antenna hole
6 Top stabilizer strut
7 Bottom stabilizer strut
8 Antenna
9 Rear ring
10, 11, 12 Holes in Fabric
20 Sheet
22 Tab
24 Slit
26 Slit
28 Slit extension
30 V-Notch
32 Front extension
34 Front top hole
36 Rear top hole
38 Bottom holes
40 Bottom extension
42 Top indentation
44 Tubing
46 Twist lock
48 Cinch tie

SUMMARY

The purpose of the windsock of the invention is to allow its owner to express his or her identify with an idea, concept, or thought. For years, the advertising industry has introduced many successful mediums of advertisement and self identification. Such examples are the T-shirt, the button, bumper stickers, baseball hats, and the little yellow sign in the back of cars reading, "Baby On Board" or some other expression. The most widely used areas of self expression pertain to persons' heads, chests, and their automobiles. While the little yellow sign and the bumper sticker were extremely successful and in some cases, certainly a fad, an attractive alternative to these items would be desirable.

Our windsock is a beautiful, streamlined tubular device which extends back from the antenna of the automobile. When the car is traveling, the windsock stands rigidly at a horizontal orientation. This allows for the message on its side to be read. In one embodiment, it is made of nylon and is very inexpensive to produce. Unlike the bumper sticker, the windsock is very easy to remove and does not look tacky. While it is easy to steal if its owner chooses not to use a cinch-lock, this ease will tend to obviate many cases of antenna vandalism. Even though it can be removed easily, we have securement methods which make the likelihood of it flying off during the operation of the car very slim. The windsock will make an excellent advertising tool for election campaigns, auto dealers, corporations, and sports franchises. Also its attractiveness will appeal to the masses as the new mode of identification.

DESCRIPTION—FIGS. 1 TO 9—FABRIC COVERED SKELETON EMBODIMENT

FIGS. 1 to 9 show a nylon and frame unit according to one embodiment of the invention. The unit is comprised of a plastic (acrlylic) skeleton or frame having a front ring 1 and a rear ring 9 which are connected in part (usually by glue) by rods 6 and 7. These rods are approximately 30.5 cm long. The unit's pattern total length (FIGS. 8 and 9) is 34 cm. The diameter of the front ring is 7 cm, outside diameter, and the rear ring is 5.4 cm, outside diameter. Front ring 1 has a series of holes 4, 4A, and 5 at the bottom, and 3 at the top. These holes are approximately 0.95 cm in diameter and may be reinforced by grommets (not shown, but usually metal or plastic).

Surrounding the skeleton is a cover or main body of satin, nylon, or other fabric 2 which has holes which mate with those in the skeleton. Specifically cover 2 has a bottom elongated hole 10 (FIGS. 2 and 5) which extends over holes 4, 4A, and 5, a top front hole 11 (FIG. 1), and two additional top rearward holes 12 which are spaced apart on either side of rod 6 to accommodate highly slanted and skewed antennas.

FABRICATION

Figure 2:
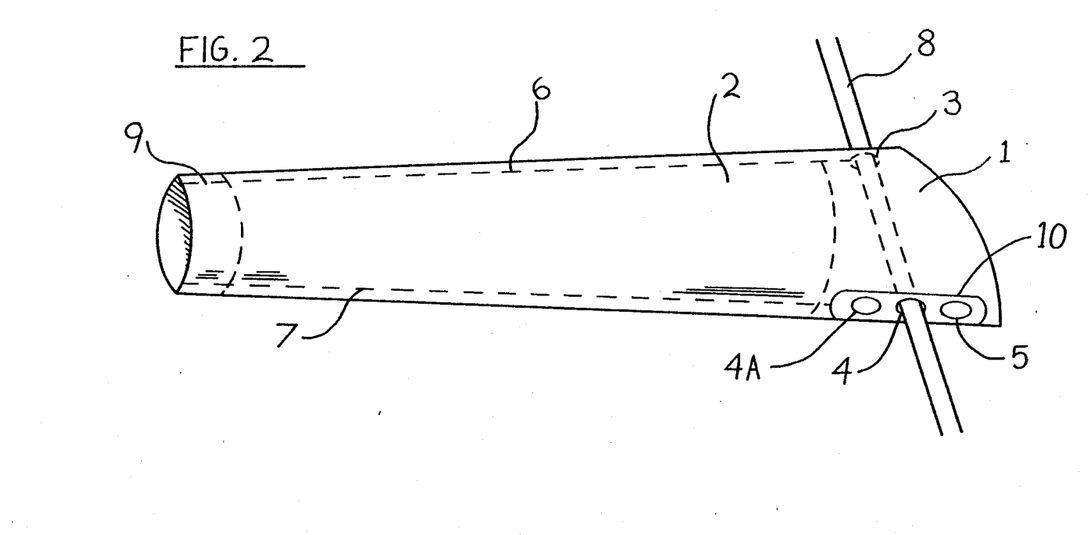
FIGS. 2, 3, 4, and 5 are elevated side, front, rear, and bottom views of such windsock.
Figure 3:
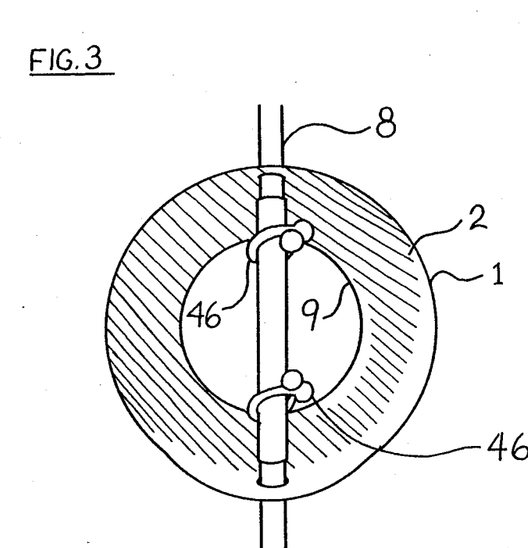
Figure 4:
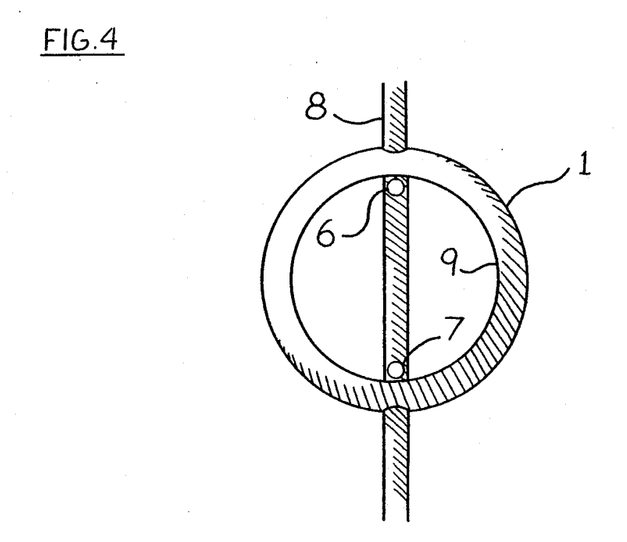

The reinforced hollow fabric cone or windsock will provide the user with a method of expression or advertisement to display a name, message, etc. This will allow the user to express a thought or concept. It will appeal to the masses as a new mode of identification. We call this antenna advertising. It is best shown in FIG. 2. A vehicle's antenna 8 is used as an axis or main source of support.

To prevent the unit from sliding up or down on the antenna we use a pair of nylon twist ties 46 (FIG. 3) which are clipped around the antenna adjacent the inside upper and inside lower surfaces of the windskin. Alternatively we can use spring-loaded alligator clip clamps (not shown). Although the unit has a tendency to slide upward while the car is moving, either type of clamp will be strong enough to prevent this at any speed.

The antenna passes through holes 3 and 4 in front ring 1 (FIG. 2). Through study we observed that different automobiles have antennas at varied angles, from straight up (90° to the horizontal) to approximately 35°, as shown in FIG. 7. The series of holes will insure the most efficient aeronautical flight for our invention on almost any car. The windsock works most effectively if the sides are parallel with the ground, as shown in FIG. 7.

The unit should be attached no higher than about 15 cm above the base of the antenna since this area has less vertical sway and movement created by drag of the unit. The main functions of the front ring are (1) to create form, (2) to provide a stable body part which can be attached to the antenna, (3) to provide a fastening end for the upper and lower stabilizer rods, and (4) to provide shape for the front of the cone.

Rear ring 9 forms the back part of the windsock. It has a perimeter of 17.1 cm when fastened. The total pattern size is 18.1 cm. The rear ring is desirable to stabilize the unit, i.e. to prevent erratic motions which might make its message illegible in the agitated wind. The functions of the rear ring are (1) to create form, (2) to create a rear attachment for the upper and lower stabilizer rods, and (3) to add stability to the overall unit.

Figure 6:
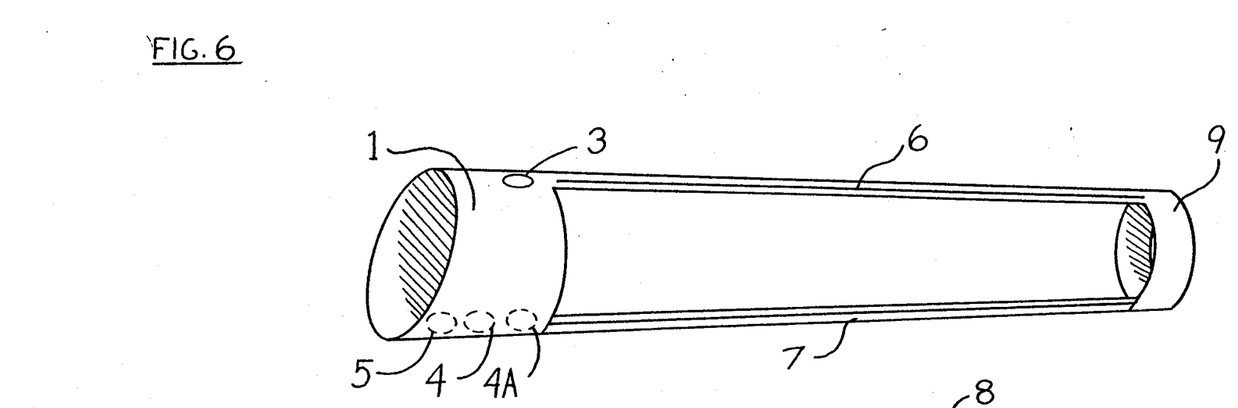
FIG. 6 is a side view of the skeleton or frame of such windsock.
Figure 7A:
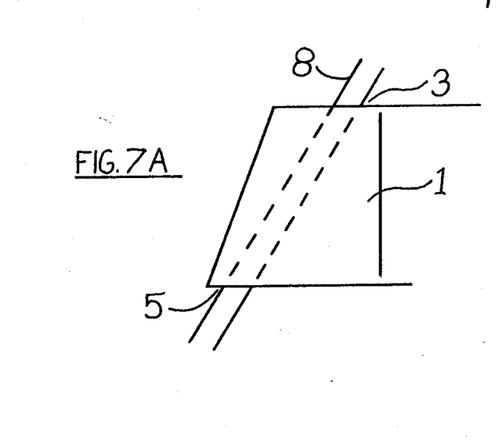
FIG. 7A to FIG. 7D are side views of part of such windsock mounted on antennas of varying slopes.
Figure 7B:
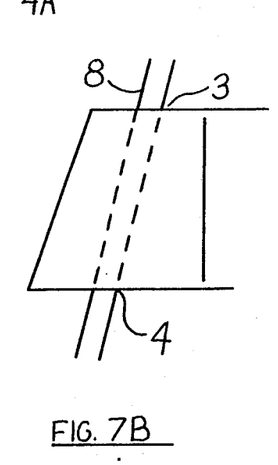
Figure 7C:
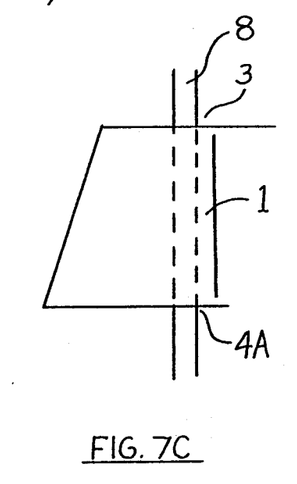
Figure 7D:
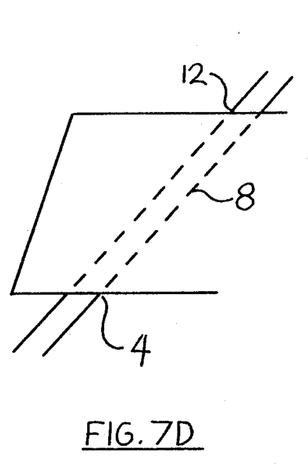
Figure 8:
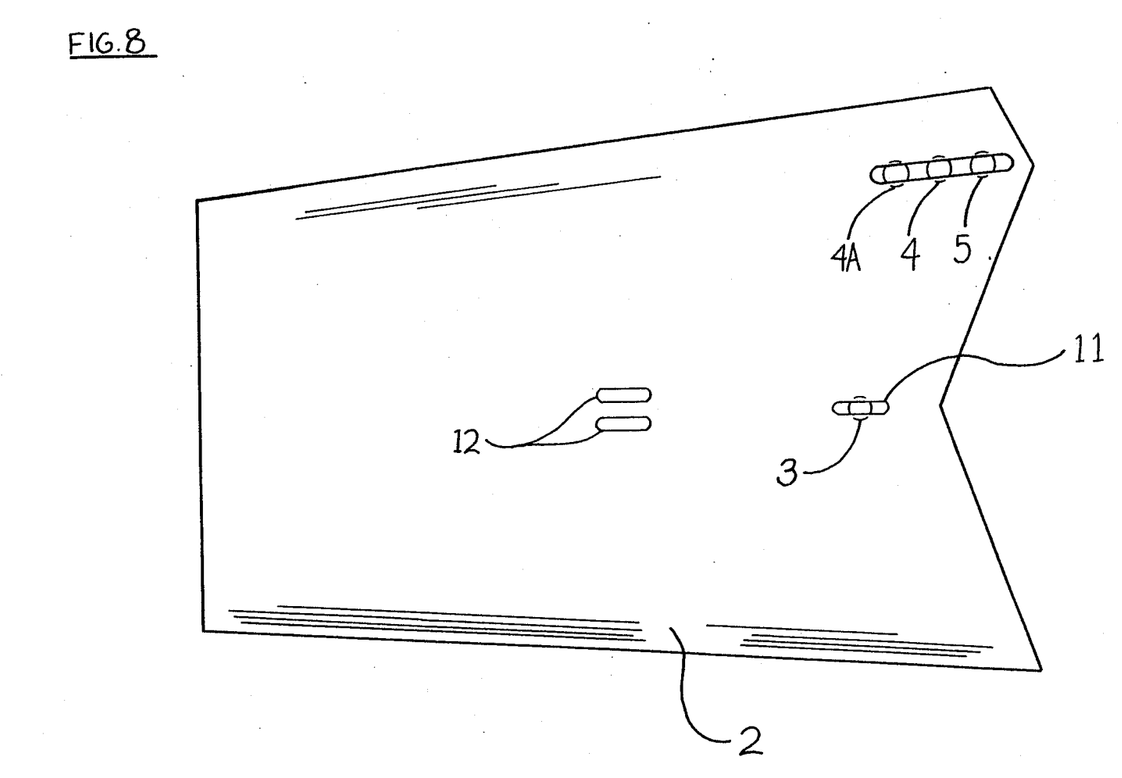
FIGS. 8 and 9 are flat outside plan and flat inside plan views of such windsock shown in a flattened state.
Figure 9:
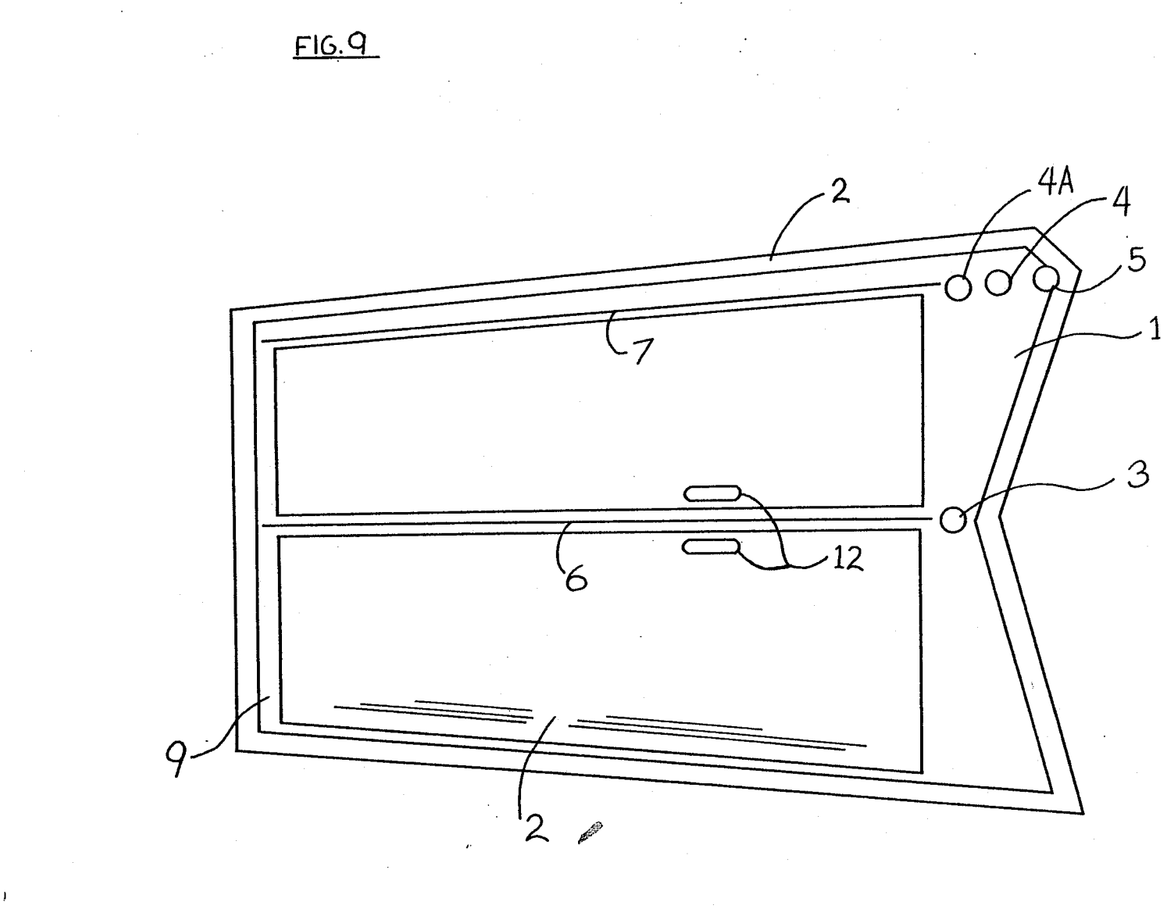

FIG. 6 shows the skeleton of the windsock. Rods 6 and 7 are approximately 31 cm in length. These rods are usually fastened by glue to front and rear rings 1 and 9, but may be integral. These rods reduce or eliminate the instability created from all the known variables. Our theory is that any physical force affecting the windsock can be called "agitated flow" which is created by movement acceleration of the vehicle. In addition, crosswinds, vibrations of the vehicle, the vehicle's passing over bumps, and antenna movements created by agitated flow through the unit are other physical forces affecting it.

Figure 1:
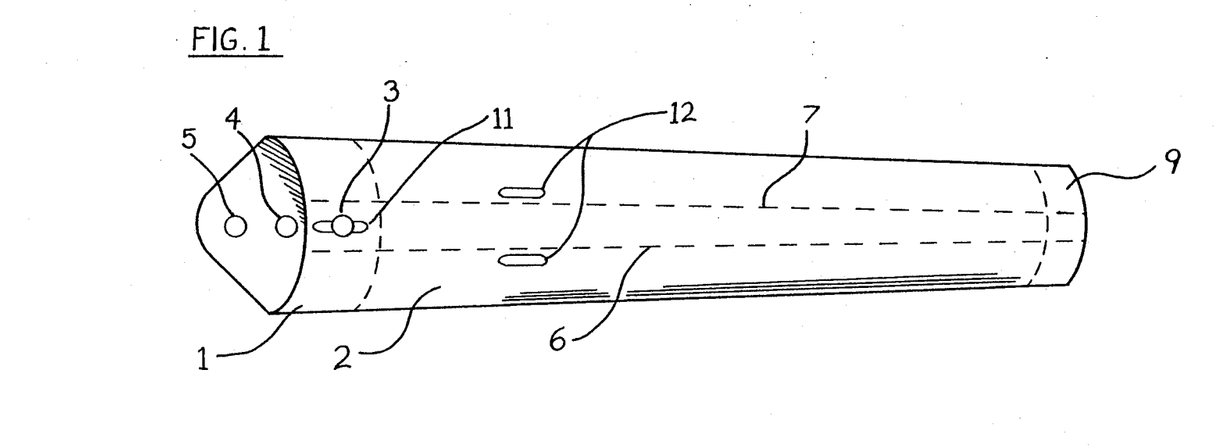
FIG. 1 is a top view of a reinforced-fabric windsock according to one embodiment of the invention.
Figure 5:
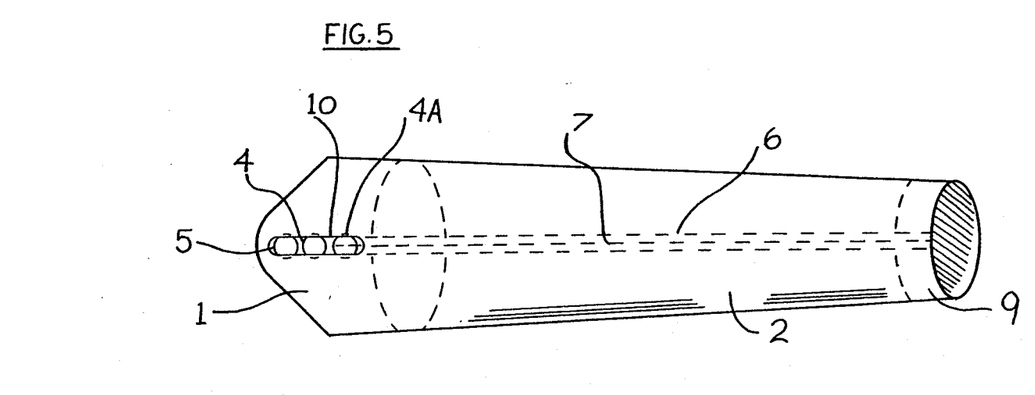

Outer shell or body 2 of the windsock usually consists of fabric which preferably is durable yet attractive. The fabric must be durable because of the constant agitated flow to which the unit is being subjected. Satin or any similar but durable polyester fabric is suitable. After cutting the fabric to the appropriate size and pattern, we sunscreen an advertisement or message thereon, such as shown in FIG. 2. The fabric is then sewn to the conical shape and then slipped over the skeleton to from the complete unit (FIGS. 1, 2, and 5). Then the overlapping ends are connected in the front and the rear. This conection can be achieved in many different ways, preferably by gluing or sewing, but rivets are also suitable. Stitching overlapping the front and rear rings will secure the basic frame to the main body and provide a very effective means of attachment. Gluing is cheaper but not as secure.

In most cases the end of the antenna has a circular finial ball which varies in size. After inspecting many different ends we found that 0.95 cm is the optimum size for the antenna holes on the windsock.

PROTOTYPE TEST

To arrive at our final prototype, we had to test different prospective prototypes by trial and error on automobiles. We found that the stabilizer rods made the windsock work properly under all conditions. We finally chose the prototype unit that both performed well and looked attractive to the eye. The frame and sleek design allows our unit to be stable at speeds of up to 90 mph.

DESCRIPTION—FIGS. 10 TO 15—PLASTIC SHEET EMBODIMENT

The embodiment of FIGS. 10 to 15 is presently preferred. It is made of a flat plastic sheet 20 (FIG. 15), preferably of vinyl (calendared on the outside and matte on the inside) 0.38 mm in thickness. Sheet 20 is rolled into the conical shape of FIGS. 10 and 11. Sheet 20 has the shape indicated, scaled as indicated. Its overall length is preferably about 26 cm and its overall width is about 20 cm.

Figure 15:
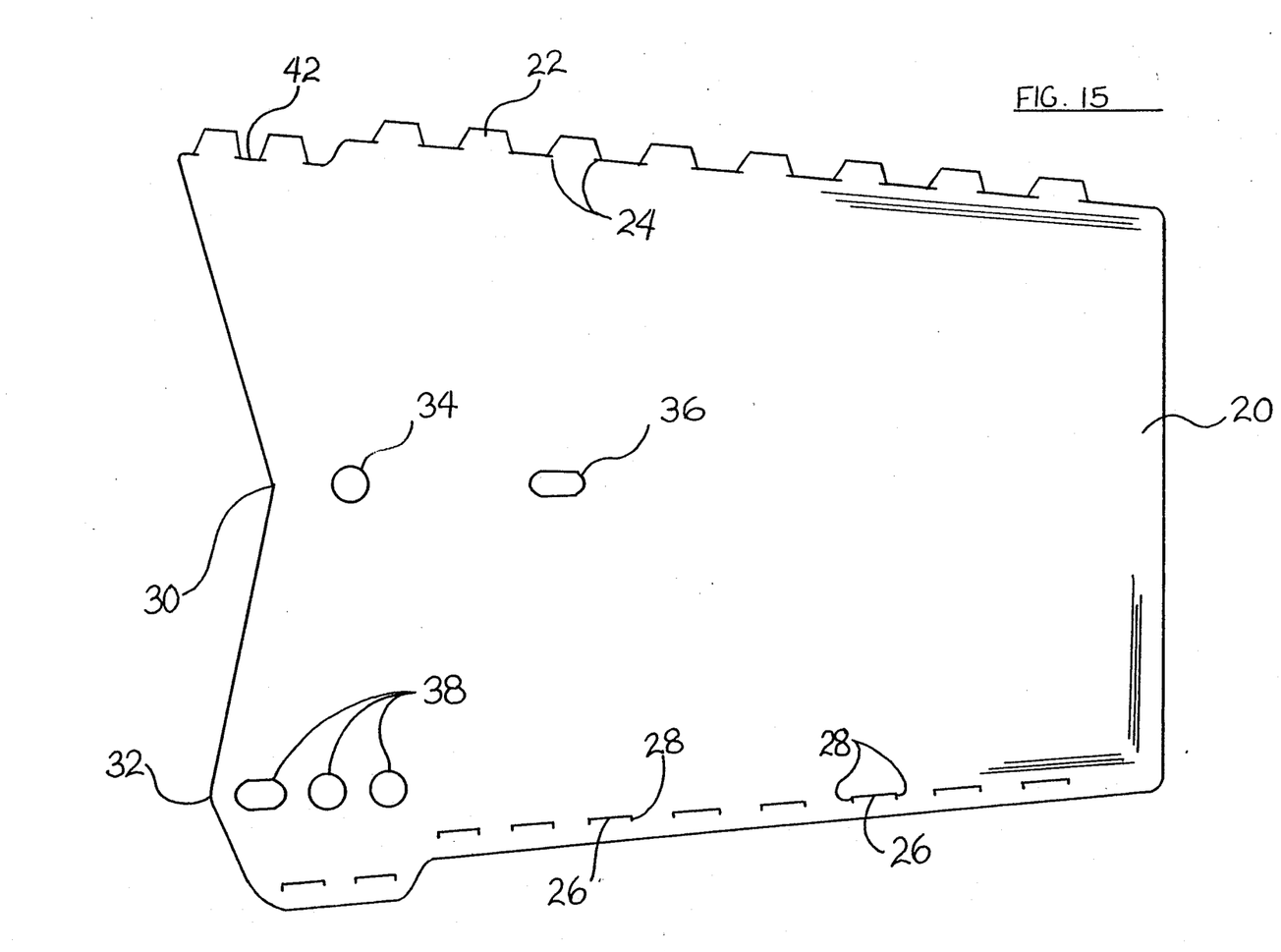
FIG. 15 is a plan view of the inside of such windsock in a flattened state.

Its upper edge comprises a series of trapezoidal tabs, such as 22, each of which is about 6 mm long by about 12 mm wide at the base. Each base is undercut at both sides at its line of joinder to the main body of the sheet by cuts 24 which are each about 1–2 mm. The tabs are spaced apart by about 9 mm. Adjacent the lower edges are a series of mating horizontal slits, such as 26, each of which is about 10 mm long and has two vertical end slit extensions 28 about 1 mm long.

Figure 11:
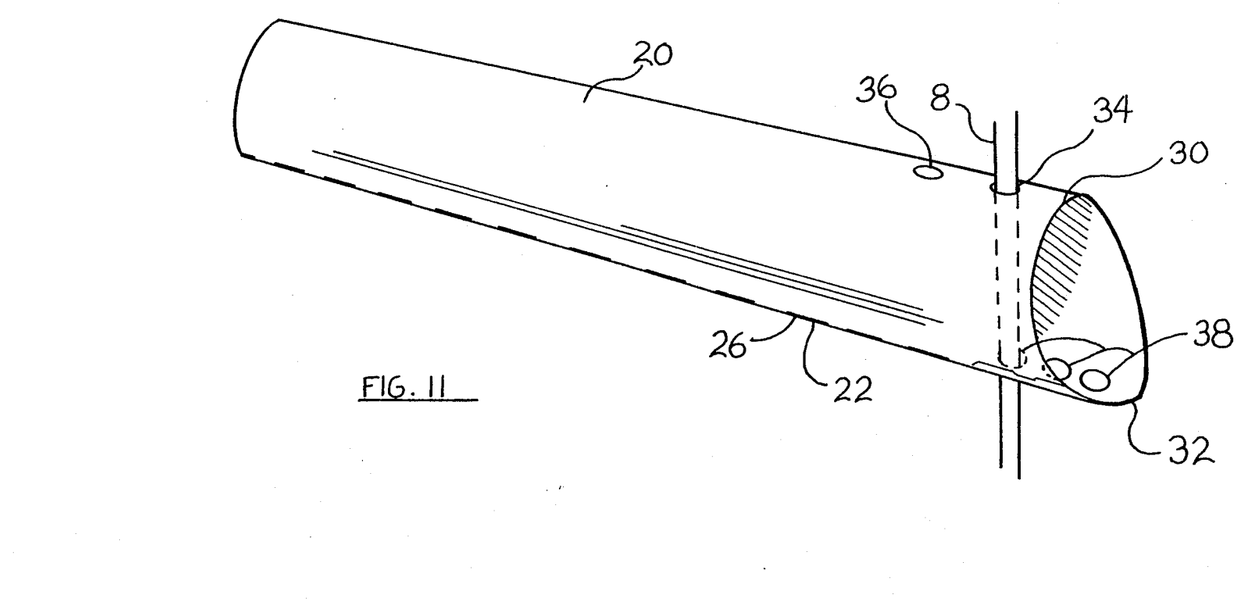

The left end of sheet 20 has a large V-shaped notch 30 which causes the windsock to have a projecting lower part 32 (FIG. 11). The center of the sheet has two antenna holes 34 and 36, each about 11 mm in diameter. The right edge of the sheet is straight.

The bottom, left edge of the sheet has a series of three holes 38, each about 11 mm in diameter.

The bottom left corner of the sheet has an extension portion 40 and the top left corner has a mating indented portion 42. The extension portion enables holes 38 to be formed nearer the lower edge so that they will be directly opposite holes 34 and 36 when the sheet is rolled into a cylinder. A message (not shown, but as in FIG. 2) is printed on the sheet before it is rolled, preferably by silkscreening. Alternatively the message may be placed onto the sheet by an adhesive label, after it is formed into the cylindrical shape.

FABRICATION AND INSTALLATION—FIGS. 10–15

Figure 10:
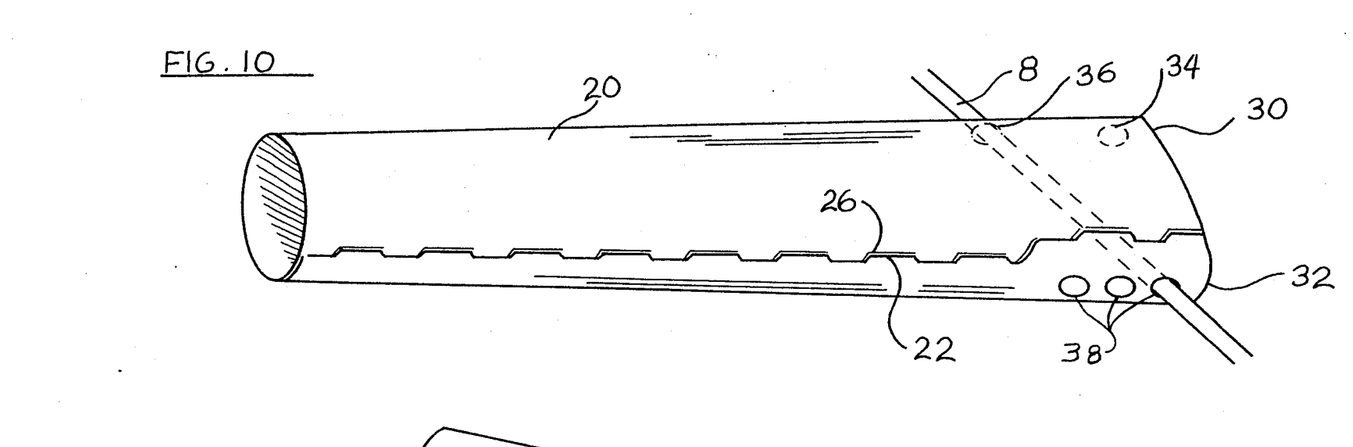
FIGS. 10 and 11 are perspective side/below and side/above views of a plastic-sheet windsock according to an alternative embodiment of the invention.

In operation, sheet 20 is rolled into a cylindrical shape, as shown in FIGS. 10 and 11. Tabs 22 are inserted into their respective mating slits 26 where they will self lock due to slits 24. Optionally the mating edges of the sheet can be glued for added stability. The resultant cylindrical windsock is placed over antenna 8, selecting the proper holes so that the sock will be substantially horizontal, regardless of the angle of the antenna's angle. I.e., if the antenna slants back at a steep angle as shown in FIG. 10, the frontmost of bottom hole 38 and rear top hole 36 are used, whereby the sock will have a horizontal orientation. If the antenna is substantially vertical, as shown in FIG. 11, the rearmost of bottom holes 38 and front top hole 34 are used; these holes are vertically in line so that the windsock will again be horizontal.

Figure 12:
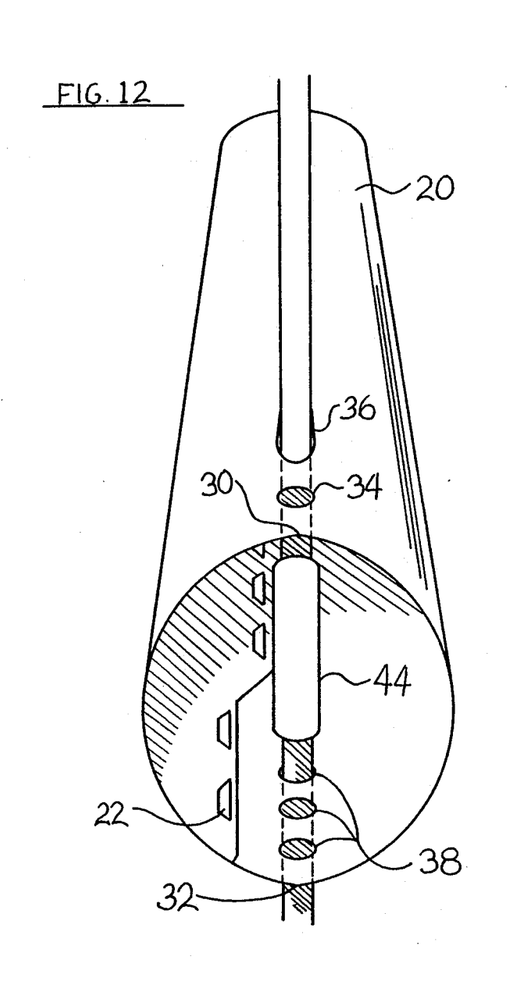
FIG. 12 and 13 are front/above perspective views of such windsock, showing a retaining tube and a retaining tube with a twist lock.
Figure 13:
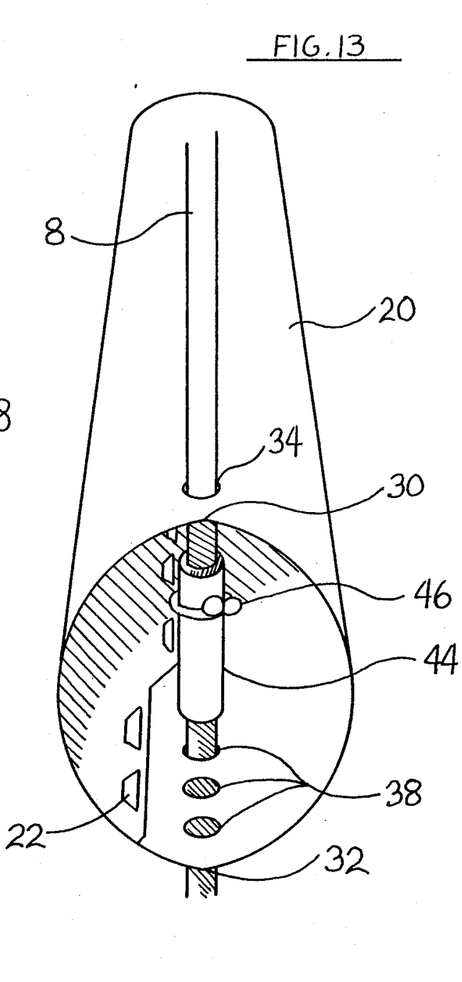
Figure 14:
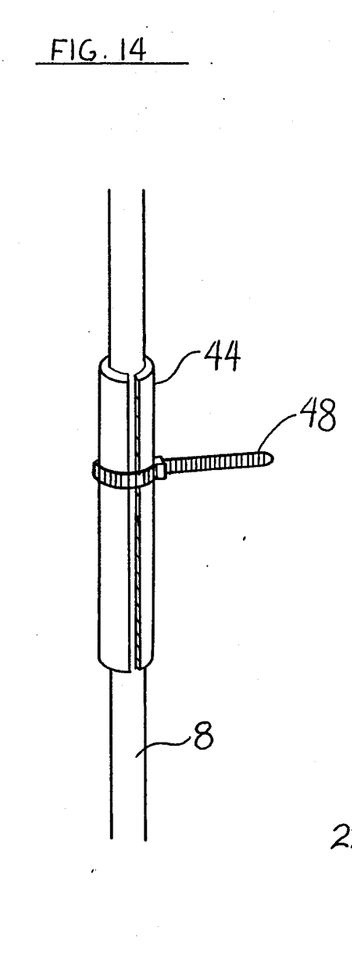
FIG. 14 is a side perspective view of such retaining tube.

To maintain the vertical position of the windsock on the antenna, as shown in FIG. 12 and the enlarged close-up of FIG. 14, a stay comprising a length of surgical rubber tubing 44 may be attached to antenna 8, inside the windsock. Tubing 44 is made of rubber, should be almost as long as the inner diameter of the front opening of the windsock, and can be about 12 mm in overall diameter, 4 mm in inside diameter, and have a slit throughout its entire length about 2 mm wide so that it can be slipped over the antenna after the windsock is installed. The stay has sufficient friction with the antenna to maintain the windsock's position thereon regardless of wind, vehicle's speed, etc. Optionally, two shorter stays (not shown) can be placed adjacent the top inside and the bottom inside of the sock.

To provide added stability, a nylon twist lock 46 may additionally be placed over stay 44 to cause stay 44 to grasp antenna 8 more tightly. Alternatively twist lock 44 may be used alone, without stay 44. A cinch lock or tie 48 (FIG. 14) can be placed around the rubber tubing to help deter theft.

The advantages discussed above with respect to the cloth covered windsock of FIG. 1 et seq. are also applicable to the plastic sheet windsock of FIGS. 10 to 15. In addition the sheet embodiment is easier and cheaper to manufacture.

CONCLUSION, RAMIFICATIONS, SCOPE

While the above description contain many specifities, the reader should not construe these as limitations on the scope of the invention, but merely as exemplifications of preferred embodiments thereof. Those skilled in the art will envision many other possible variations. For example, skilled artisans will be able to readily change the dimensions and shapes of various embodiments. They will be able to make the windsock of alternative materials, such as plastic, cotton, velvet, polyester, silk, wool, rayon, orlon, paper, and any exotic or uncommon materials. The windsock can be used on boats and trucks, as will as outdoors or indoors for decoration. The size and shape can be altered by changing the diameter of the opening at either end of the windsock. This can be as low as one and one-half inches to four inches at either end. The length can be altered from as short as 7.6 cm to as long as 61 cm. The diameter can be varied as to the desires of the designer or manufacturer, using any of the materials listed in part together or alone. The geometric shape of the windsock can be changed at the opening or at the rear as desired by the manufacturer. Any slogan or saying can be used. This also includes any color, flag colors or references to animals or animal body parts and/or humans and any other physical item. They can make the method of attachment different by using two pieces of tape, clamps, etc. They can make the unit with more or fewer antenna holes and the holes can be made small and elasticized or sized to fit snugly on the antenna so that the windsock will be self-supporting without the tubing of the twist ties. They can attach the windsock to different parts of the automobile. They can change the length or frame. They can use grommets on the antenna holes or use a different method of adjustment. They can make the front or rear rings out of a different materials. They can make the stabilizer rods out of different materials, such as cardboard, aluminum, or any other materials. They can use a different form of fastening, such as gluing or riveting the body together.

Accordingly the reader is asked to determine the scope of the invention by the appended claims and their legal equivalents, and not by the examples which have been given.

We claim:

1. An antenna-mountable windsock, comprising:
   a rigid, self-supporting, cylinder,
   said cylinder having open front and back ends so that wind can pass therethrough,
   means for attaching said cylinder to a vehicle's antenna, said means comprising at least three holes in said cylinder,
   said holes being sized to accept an antenna of a predetermined diameter,
   a plurality of said holes being spaced along the length of one side of said cylinder and at one end of said cylinder,
   at least one of said holes being formed in the other side of said one end of said cylinder, opposite said plurality of holes,
   whereby said antenna can be inserted through said one of said holes in said other side of said cylinder and through a selected one of said plurality of holes on said other side of said cylinder so that said cylinder can be mounted in a horizontal orientation regardless of the angle of said antenna within a predetermined range of angles.

2. The antenna-mountable windsock of claim 1 wherein said means comprises means for snugly embracing the part of the shaft of said antenna within said cylinder so that said cylinder will not be able to slide on said antenna.

3. The antenna-mountable windsock of claim 2 wherein said means comprises a segment of elastic tubing.

4. The antenna-mountable windsock of claim 3 wherein said segment of elastic tubing is slit along the length thereof.

5. The antenna-mountable windsock of claim 2 wherein said means comprises at least one twist tie mounted around said antenna's shaft.

6. The antenna-mountable windsock of claim 2 wherein said means comprises a segment of elastic tubing and a twist tie.

7. The antenna-mountable windsock of claim 2 wherein said means comprises a pair of twist ties mounted around said antenna's shaft, one adjacent an upper side of said cylinder, the other adjacent the lower side of said cylinder.

8. The antenna-mountable windsock of claim 1 wherein said cylinder comprises a sheet of plastic rolled into a cylindrical shape.

9. The antenna-mountable windsock of claim 8 wherein said cylinder has a longitudinal seam thereon where the edges of said sheet are attached.

10. The antenna-mountable windsock of claim 9 wherein said edges of said sheet have mating tabs and slits and said each tab is inserted into a mating respective slit to form said seam.

11. The antenna-mountable windsock of claim 1 wherein said cylinder comprises a rigid skeleton and a flexible covering thereover.

12. The antenna-mountable windsock of claim 11 wherein said skeleton comprises a front ring, a rear ring, and a pair of rods connecting said rings.

13. The antenna-mountable windsock of claim 11 wherein said flexible covering is made of fabric.

14. The antenna-mountable windsock of claim 1 wherein said cylinder has humanly readable symbols thereon.

15. The antenna-mountable windsock of claim 1 wherein said cylinder has a tapering shape.

16. The antenna-mountable windsock of claim 1 wherein said cylinder has a front edge which has a bottom portion which projects forward of the top portion of said front edge.

17. The antenna-mountable windsock of claim 1 wherein said plurality of holes are in a longitudinal row.

18. The antenna-mountable windsock of claim 1 wherein said cylinder has a plurality of holes on both sides of said one end thereof.

19. The antenna-mountable windsock of claim 18 wherein said cylinder has three holes on a bottom side thereof and two holes on a top side thereof.

* * * * *